July 26, 1966 G. E. ZENZEFILIS 3,263,223

GAP SCATTER CORRECTION APPARATUS

Filed Oct. 31, 1961 2 Sheets-Sheet 1

INVENTOR
GEORGE E. ZENZEFILIS
BY
Douglas M. Clarkson
ATTORNEY

GAP SCATTER CORRECTION APPARATUS

Filed Oct. 31, 1961 2 Sheets-Sheet 2

INVENTOR
GEORGE E. ZENZEFILIS
BY
Douglas M. Clarkson
ATTORNEY

United States Patent Office 3,263,223

Patented July 26, 1966

3,263,223

GAP SCATTER CORRECTION APPARATUS

George E. Zenzefilis, Huntington, N.Y., assignor to Potter Instrument Company, Inc., Plainview, N.J., a corporation of New York Filed Oct. 31, 1961, Ser. No. 149,090
9 Claims. (Cl. 340—174.1)

The present invention, generally, relates to a circuit for correcting the skew in a magnetic tape record-playback system and, more particularly, to a monostable multivibrator circuit having a selectively variable output pulse width connected to control skew in a record-playback system.

A magnetic tape such as used in computer equipment usually has several tracks extending along the length of the tape, and information characters are represented by the individual bits along a line transverse to the tape length. However, a certain amount of skew in the transverse line of information bits developes when the "record" (or playback) head is not aligned exactly transverse to the direction of tape travel.

To align a head transversely of a tape with a high degree of accuracy is not an easy task mechanically, and several attempts have been made to accomplish the same result electrically. Usually, such prior attempts have included delay lines in various arrangements, but care must be exercised to avoid changing the form of the information signal to an extent that the information is lost.

A record-playback system or machine is often called upon to read out the information recorded on tapes by other machines. Since the alignment of the recording heads on each machine will not be the same, the skew correction required will depend upon the machine on which the recording was made and a different correction will be required on the machine reading out the information for each different machine on which the tapes were recorded. If the desired skew corrections are provided by mechanically adjusting the position of the heads then the difficult mechanical adjustment must be made each time a tape from a different machine is to be read out. In accordance with the present invention the skew correction is made electronically by means of monostable multivibrator circuits, each of which is provided with means to select one of a plurality of predetermined delays. The predetermined delays which can be selected for each monostable multivibrator circuit are set to correct for the different skews corresponding to the different machines on which the tapes were recorded. In this manner the repeated difficult mechanical adjustment of the heads is avoided.

Accordingly, it is a principal object of this invention to provide a circuit which is adaptable to control the timing in another device such as a magnetic tape information storage system.

It also is an object of the invention to provide a circuit to extend the trailing edge of a pulse a predetermined interval.

Another object of the invention is to provide a circuit for changing the output pulse width of a monostable multivibrator.

Still another object of the invention is to provide a timing control for correction of skew due to a record or playback head not being perpendicular to the direction of travel of a magnetic tape.

Briefly, the monostable multivibrator of the invention includes first and second gate means and the usually associated circuitry to provide one of said gate means normally open and the other normally closed. The circuitry associated with the normally closed gate means has a predetermined time constant so that the output voltage pulse from the multivibrator has a predetermined width. A principal feature of the invention is the provision of circuitry to selectively change the time constant so that the width of the output pulse is changeable.

A particularly unique combination which characterizes the present invention is the monostable multivibrator and time-constant-controlling circuitry connected with a magnetic tape record-playback system to correct for skew. In this arrangement the information bit pulse triggers the multivibrator so that the trailing edge of the bit pulse is delayed, effectively, for a length of time determined by the time constant of the multivibrator. With the trailing edge of each bit pulse in each track delayed effectively, all of the trailing edges can be aligned with a relatively high degree of accuracy.

The above and other objects and advantages of the invention will be pointed out and described in greater detail hereinafter in conjunction with the accompanying drawings, in which.

Figure 1:
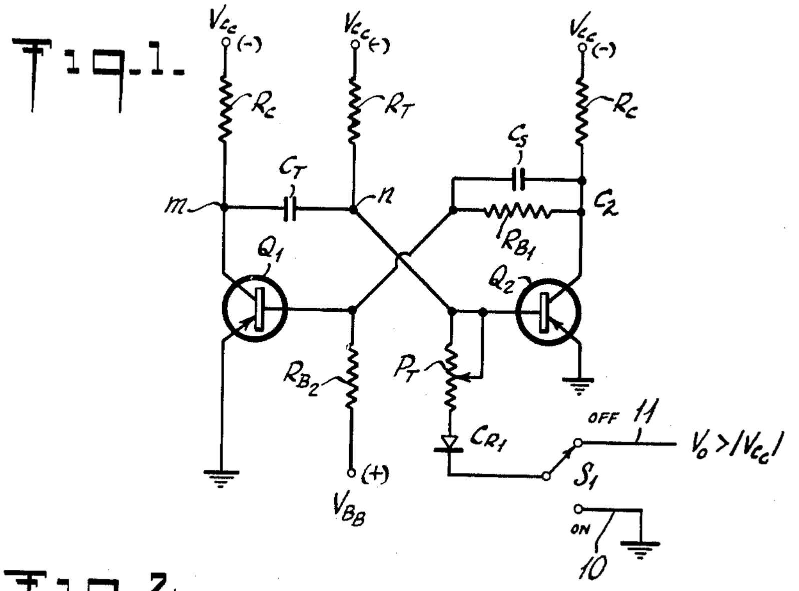
FIGURE 1 is a basic monostable multivibrator circuit with a circuit arrangement to change the time constant in accordance with the invention.

In FIGURE 1 of the drawings is shown a typical one-shot circuit where for simplicity the triggering is not shown since there is a variety of methods to perform the triggering and since such triggering methods are quite well known in the art. While the first and second gating means $Q_1$ and $Q_2$ are shown in FIGURE 1 as being transistors, it is understood that any other suitable gating means may be used. It is contemplated that during the stable cycle, $Q_1$ is turned "off" and $Q_2$ is turned "on."

The instant that triggering is effected, $Q_1$ is turned "on" which results automatically in $Q_2$ being turned "off" because a positive voltage equal to the absolute value of the collector supply voltage $V_{cc}$ appears at the base of $Q_2$, since a capacitor $C_t$ cannot discharge instantaneously. $Q_2$ will remain "off" until this positive voltage is attenuated to approximately 0; that is, until the capacitor $C_t$ discharges through the resistor $R_t$.

Figure 7:
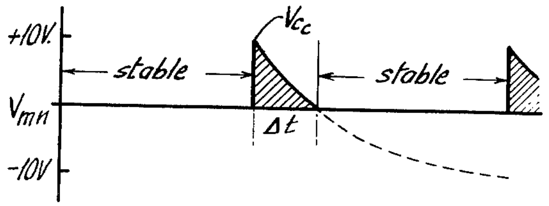
FIGURE 7 is a voltage curve showing a pulse decay for the unstable cycle of the monostable multivibrator shown in FIGURES 1 and 5.

Thus, the voltage at the base of $Q_2$ will tend to decrease exponentially from a positive value $V_{cc}$ toward a negative $V_{cc}$, but of course, it will be arrested very near the 0 level, since at that instance $Q_2$ will be turned "on." This is illustrated in FIGURE 7 of the drawings where the voltage $V_{mn}$ becomes equal to the voltage $V_{cc}$ at the instant of triggering, and this voltage declines exponentially toward a value of $-V_{cc}$. At or very near to 0, the unstable cycle is terminated, and the declining voltage curve is halted at that value.

Figure 8:
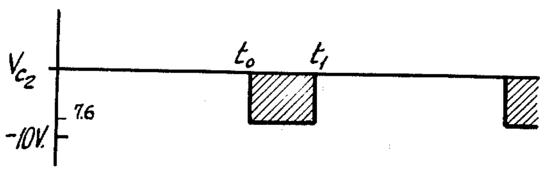
FIGURE 8 is a voltage curve showing a pulse output from the multivibrator of FIGURES 1 and 5 during the unstable cycle.

The width of the output pulse will be equal to the time interval of the exponential function shown in FIGURE 7, with $C_tR_t$ as the time constant and is determined by the time which is required to decay to approximately one half of its original value, or as shown in FIGURE 8 of the drawings, the time interval $t_0$–$t_1$.

Viewing FIGURES 7 and 8, it becomes evident that to change the width of the output pulse $V_{c2}$ (FIGURE 8) it is necessary to change the effective time constant either by altering the value of the capacitor $C_t$ or by altering the value of the resistor $R_t$. Since both sides of the capacitor $C_t$ are active from the point of view of signal information, it is preferable to change the value of the resistor $R_t$.

This is accomplished in accordance with the invention by terminating a series-connected potentiometer $P_t$ and a diode CR1 (FIGURE 1) to either a ground 10 or to a positive potential $V_0$ higher than an absolute value of $V_{cc}$ as indicated at the terminal 11 of a switch S1. When the switch S1 is connected to ground 10, the resistance of potentiometer $P_t$ conducts and effectively changes the discharge time constant of the capacitor $C_t$. In the instance when the switch S1 is connected to the voltage $V_0$ at terminal 11, the potentiometer $P_t$ is not conducting and the initially specified time constant $C_tR_t$ is not altered.

In operation of the circuit shown in FIGURE 1, for example, assume that a bit pulse is applied to trigger the multivibrator from its stable state to its unstable state, the capacitor $C_t$ is charged instantly to a value $V_{cc}$ and begins to discharge in accordance with the curve shown in FIGURE 7. During this discharge interval, an output voltage, which may be taken at point $C_2$, appears as shown in FIGURE 8, the width of this pulse $t_0$–$t_1$ being determined by the time constant of the condensor $C_t$ as controlled by the value $C_tR_t$.

To alter the slope of the curve shown in FIGURE 7, a resistor $P_t$ is connected, effectively, in parallel with the resistor $R_t$, thus changing the time constant and the resulting output pulse width $t_0$–$t_1$.

Figure 3:
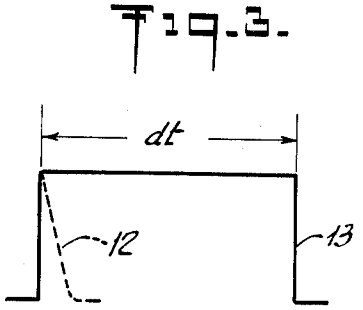
FIGURE 3 is a pulse width showing a delay in the trailing edge as provided by the invention.

The time interval $t_0$–$t_1$, is represented by "*dt*" as shown in FIGURE 3 of the drawings, and the dotted line 12 indicates the trailing edge of the information bit pulse and the line 13 indicates the trailing edge of the pulse developed during the unstable cycle of the multivibrator.

Therefore, while the term "delay" may be used to refer to the effect which is developed by the trailing edge of the corrective one-shot output pulse, the trailing edge of the information pulse is actually uneffected. The trailing edge 13 in FIGURE 3 is the trailing edge of the one-shot pulse, and there is no actual delay in the information pulse.

Figure 4:
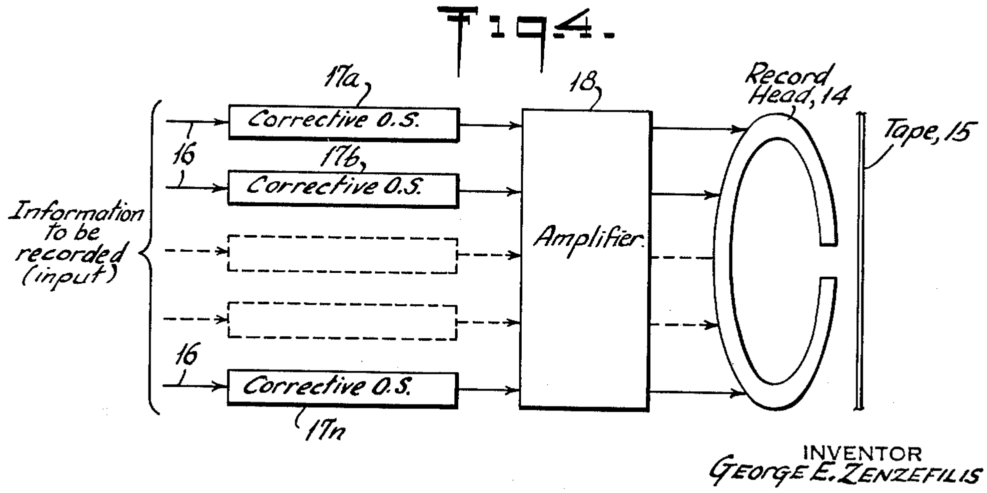
FIGURE 4 shows a corrective one-shot multivibrator connected in each respective track circuit to achieve accurate alignment of input information correcting a misalignment in the head.

Referring to FIGURE 4, a "record" head 14 is shown in juxtaposition with a magnetic tape 15. Information to be recorded on the tape 15 is supplied over leads 16 to respective corrective one-shot circuits 17*a*, 17*b*, 17*n*, each corrective circuit being for a respective track in the tape 15. The usual amplifying circuit 18 is connected between the corrective circuits 17 and the "record" head 14.

While the head 14 and FIGURE 4 is shown as being a "record" head, it is understood that the invention is applicable equally to a "playback" head.

Figure 2:
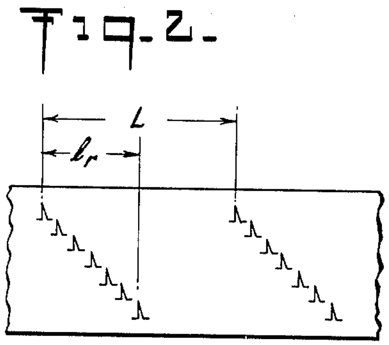
FIGURE 2 is a fragmentary tape section illustrating diagrammatically skewed information characters due to a misaligned record-playback head.

If the "record" head 14 is not in physical alignment with a line exactly transverse of the tape 15, the information pulses will be recorded on the tape 15 at a skewed angle such as shown in FIGURE 2 of the drawings. The purpose of the corrective one-shot multivibrator circuits 17, FIGURE 4, is to align the information pulses, and therefore, the result is a compensation for the misalignment of the head.

Figure 6:
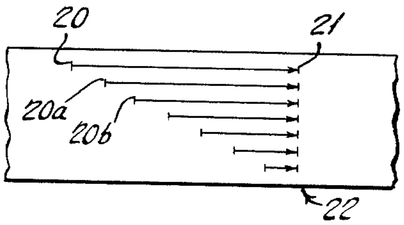
FIGURE 6 is a diagrammatic illustration of a tape fragment showing an effective alignment of an information character by aligning the trailing edges of the pulses.

Since it is the trailing edge of each information pulse that is significant in representing the information, each of the corrective circuits 17 provides a trailing edge which is extended for a desired length of time. For example, refer to FIGURE 6 of the drawings. The first information bit pulse recorded at position 20 must be moved, effectively, to a position 21, and each successive pulse across the tape must be delayed an appropriate time interval to be in alignment with the transverse line indicated by the numeral 22. Therefore, the width of the output pulse from each respective corrective circuit 17 is determined by the interval of time represented by the distance between the information pulse 20, 20*a*, 20*b*, etc. to the transverse line 22.

One such pulse width is shown in FIGURE 3 and represents a time interval "*dt*." The trailing edge 13 of the pulse shown in FIGURE 3 is an effective extension or delay (effective delay) of the trailing edge 12 of the information pulse.

Figure 5:
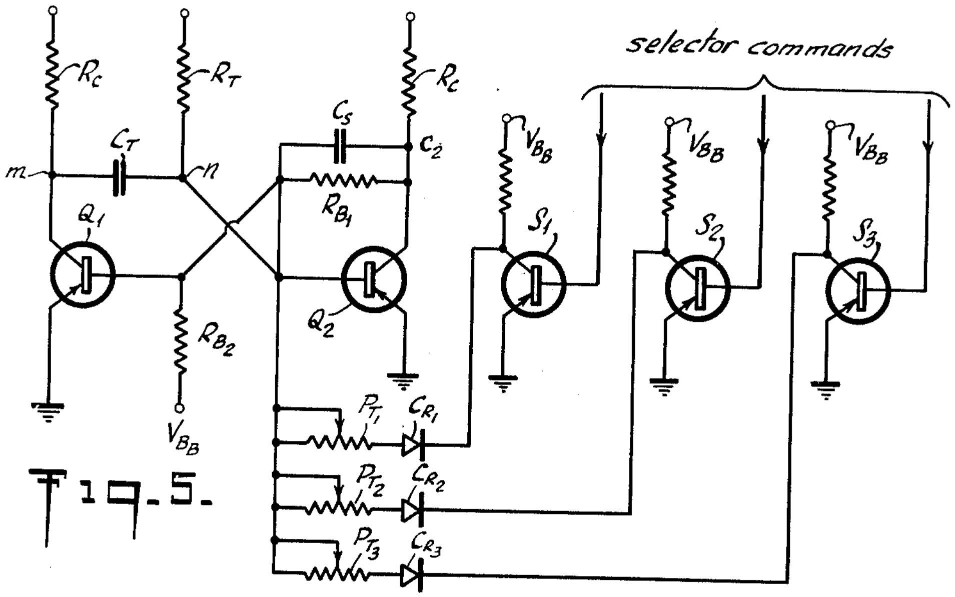
FIGURE 5 is a monostable multivibrator circuit similar to that shown in FIGURE 1 and showing circuitry to select several different time constants.

The circuit shown in FIGURE 1 and represented by the components $P_t$, $CR_1$ and $S_1$ represents limited selectivity in determining output pulse width. In contrast, the circuit shown in FIGURE 5 illustrates that the basic inventive concept may be extended to include several potentiometers $P_t$ and associated components for selection by appropriate command. Of course, the switches $S_1$ may be transistors, vacuum tubes and any other suitable switching component.

While the invention has been described and illustrated in one preferred form thereof, it is understood that the scope of the invention is determined by the scope of the appended claims.

I claim:

1. A magnetic tape information storage system comprising head means adapted for a transfer of information-representing pulses between said head means and a plurality of tracks on a magnetic tape when in juxtaposition therewith, magnetic pulse-sensing means on said head means to detect an information-representing magnetic pulse in predetermined tracks of a multi-track magnetic tape, a plurality of monostable multivibrator circuits equal to the number of tracks and each circuit being connected to be responsive to information-representing magnetic pulses in each of said plurality of tracks, and each of said monostable multivibrator circuits having a width of output pulses pre-selectable from a plurality of predetermined widths so that the trailing edges of all pulses in a particular character are aligned in a predetermined manner.

2. A magnetic tape information storage system as set forth in claim 1 wherein said monostable multivibrator circuits includes first and second gate means, one of said gate means being normally open and the other of said gate means being normally closed, electrical circuit means connected with said normally closed gate means to return said normally closed gate means to its closed condition after being triggered to an open condition, and separate circuit means connected with said electrical circuit means to vary the period of time said normally closed gate means is in an open condition.

3. A magnetic tape information storage system as set forth in claim 1 wherein each of said monostable multivibrator circuits includes a voltage supply and a voltage bias source, a first gate means, a second gate means, an electrical connection including a capacitor between said first and said second gate means, first impedance means connected from said electrical connection to said voltage supply source, the values of said capacitor and first impedance means being predetermined so that the unstable cycle of said monostable multivibrator has a pre-selected time constant, second impedance means, and circuit means to selectively connect said second impedance means with said first impedance means to alter said pre-selected time constant.

4. A magnetic tape information storage system as set forth in claim 3 wherein said second impedance means is connected in parallel with said first impedance means.

5. A magnetic tape information storage system as set forth in claim 3 wherein said second impedance means includes a plurality of impedance elements, and circuit means to select a predetermined one of said elements for connection with said first impedance means.

6. A magnetic tape information storage system comprising head means adapted for a transfer of information-representing magnetic pulses between said head means and a magnetic tape when in juxtaposition therewith, and skew controlling means connected with said head means to correct for misalignment of said head means, said skew controlling means comprising at least two one-shot multivibrator circuits each having an output pulse with a controllable width, said multivibrator circuits having a time constant to determine the width of each output pulse and means connected to each of said multivibrator circuits for changing said time constant to obtain the trailing edge of each output pulse at a predetermined time.

7. A magnetic tape information storage system comprising head means adapted for a transfer of information-representing magnetic pulses between said head means and a magnetic tape when in juxtaposition therewith, and skew controlling means connected with said head means to correct for misalignment of said head means, said skew controlling means comprising at least two monostable electrical circuits each having an output pulse with a controllable width, said circuits each having a pre-established means to determine the width of said output pulse, and electrical means connected to each of said monostable circuits for changing said pre-established means to obtain the trailing edge of each output pulse at a predetermined time.

8. A magnetic tape information storage system comprising head means adapted for a transfer of information-representing magnetic pulses between said head means and a magnetic tape when in juxtaposition therewith, and skew correcting means connected with said head means to compensate for this misalignment of said head means relative to a direction transverse of said magnetic tape, said skew correcting means comprising at least two multivibrator circuits each having an unstable state of operation and a stable state of operation, said unstable state having a predetermined time constant to control the duration of operation of said unstable state, electrical circuit means connected with each of said multivibrator circuits to selectively alter said time constant to change the duration of operation of said unstable state to obtain the trailing edge of each output pulse at a predetermined time, first means connected with said multivibrator circuits to receive information-representing pulses for switching the operation of said multivibrator circuits from said stable state to said unstable state, and second means to connect the output pulses with a utilization means.

9. A magnetic tape information storage system comprising head means adapted for a transfer of information-representing magnetic pulses along a transverse line between said head means and a multi-track magnetic tape when in juxtaposition therewith, magnetic pulse-sensing means on said head means to detect an information-representing magnetic pulse in predetermined tracks of a multi-track magnetic tape, a plurality of one-shot monostable multivibrator circuits equal to the number of tracks and each circuit being connected to be responsive with a track of said multi-track magnetic tape to provide a trailing edge for a pulse at a predetermined time interval from the leading edge of an information-representing pulse, and means for each of said multivibrator circuits selectively operable to change the time constant of such multivibrator circuit to a predetermined value so that the trailing edge is provided at a different predetermined time interval from the leading edge of the information pulse.

References Cited by the Examiner

UNITED STATES PATENTS

| | | | |
|---|---|---|---|
| 2,641,717 | 6/1953 | Toth | 307—88.5 |
| 2,793,344 | 5/1957 | Reynolds | 340—174.1 |
| 2,828,478 | 3/1958 | Johnson | 340—174.1 |
| 2,906,874 | 9/1959 | De Faymoreau et al. | 328—207 |
| 2,937,239 | 5/1960 | Garber, et al. | 340—174.1 |
| 2,948,884 | 8/1960 | Guerber et al | 340—174.1 |
| 2,975,300 | 3/1961 | Haugen et al. | 307—88.5 |
| 3,076,183 | 1/1963 | Willoughby | 340—174.1 |
| 3,103,000 | 9/1963 | Neuman et al. | 340—174.1 |

BERNARD KONICK, *Primary Examiner.*

IRVING SRAGOW, *Examiner.*

M. K. KIRK, A. I. NEUSTADT, *Assistant Examiners.*